Figure 1:
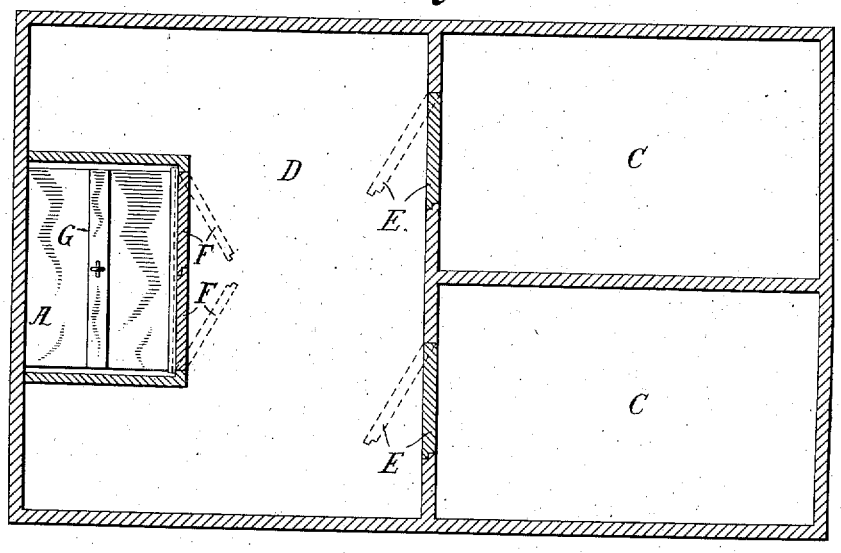

No. 12,300. REISSUED JAN. 3, 1905.

J. WILLS.

REFRIGERATOR BUILDING.

APPLICATION FILED JULY 21, 1904.

2 SHEETS—SHEET 1.

Witnesses
H. Ellis
M. Kiemeier

Inventor
James Wills
By his Attorney
Herbert Knight

No. 12,300. REISSUED JAN. 3, 1905.

J. WILLS.

REFRIGERATOR BUILDING.

APPLICATION FILED JULY 21, 1904.

2 SHEETS—SHEET 2.

Witnesses
K. Ellis
M. Kiernesser

Inventor
James Wills
By his Attorney Robert Knight

No. 12,300. Reissued January 3, 1905.

UNITED STATES PATENT OFFICE.

JAMES WILLS, OF NEW YORK, N. Y.

REFRIGERATOR-BUILDING.

SPECIFICATION forming part of Reissued Letters Patent No. 12,300, dated January 3, 1905.

Original No. 742,540, dated October 27, 1903. Application for reissue filed July 21, 1904. Serial No. 217,468.

*To all whom it may concern:*

Be it known that I, JAMES WILLS, a citizen of the United States, residing in the borough of Manhattan, in the city, county, and State of New York, have invented certain new and useful Improvements in Refrigerator-Buildings, of which the following is a specification.

Heretofore in refrigerating plants and cold-storage buildings it has been customary where elevators were employed to convey merchandise from one floor to another to provide a vestibule or anteroom between the elevator-shaft and the cold rooms in order that the cold air in the latter compartment should not escape up or down the elevator-shaft while the entrance thereto was open. This escape of the cold air was made possible because the cab did not fit the shaft and the shaft-openings with sufficient closeness to prevent a free and extensive movement of air at and around its sides or edges and also because during the rush hours of business the doors between the rooms were often left open. To obviate these difficulties as much as possible, the anteroom was provided as a sort of air-lock or buffer, and the space so employed was by reason of the shifting temperature rendered useless for storage and was consequently a loss of space. This room was also by reason of the differing temperatures wet and musty and always unsanitary. My present invention is designed to utilize this space and make it clean and wholesome and, in fact, to absorb the space in the general storage-room and make the cab a traveling anteroom, and to this end I make the cab practically air-tight, except the open face or faces or fronts, and provide flexible flaps, which bridge over and between the edges of the cab and the corresponding opening in the elevator-shaft and provide a vestibule. The result will be that while the cab is discharging or taking on goods the air in the adjoining room cannot escape through or around it. The room and space heretofore rendered unavailable for storage purposes can thus be utilized. In the employment also of the old form of anteroom as an air-lock or buffer it implied and required a double handling of the goods. It constituted an intermediary room only. This room in connection with my invention I eliminate and dispense with and absorb into the general storage-room.

Air-locks are established by merging the air in the elevator-car and each floor when they are thrown together in my present invention, as will be explained.

I will proceed to describe my invention in connection with the accompanying drawings, which form a part of this specification.

Figure 2:
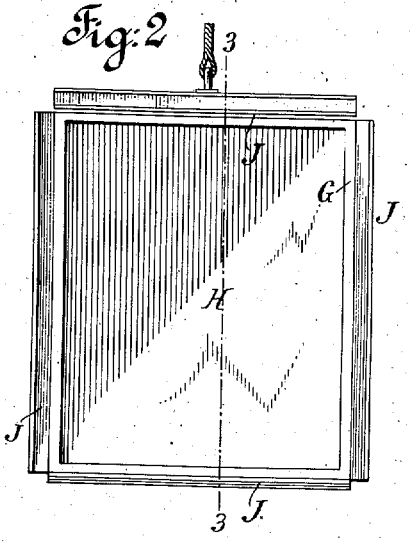
Figure 3:
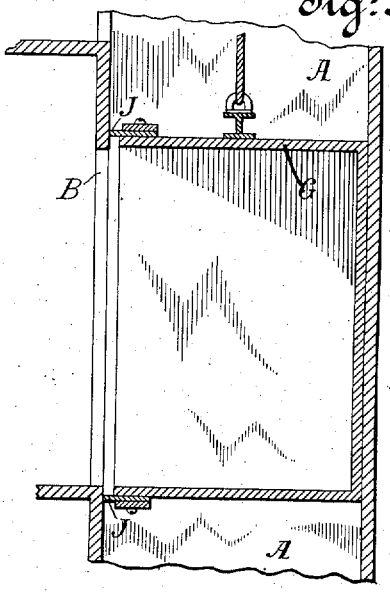
Figure 4:
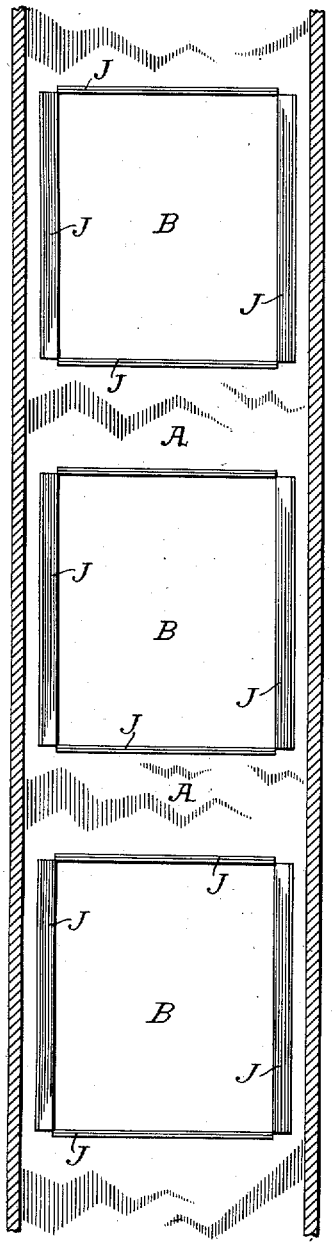

Figure 1 represents a plan view of a part of a refrigerator-building. Fig. 2 is a front view of the elevator-cab providing a traveling anteroom, showing the air-confining bridge-pieces applied. Fig. 3 is a vertical section of the same, taken on the line 3 3 of Fig. 2. Fig. 4 is a front view of the shaft-opening, showing the bridge-pieces placed thereon. This is an alternative construction.

In the drawings, A represents an elevator-shaft having openings B corresponding with the various floors of the building.

C is a cold-storage room, and D is a room through which the elevator-shaft is built and located between the elevator-shaft and the cold-storage room for the purpose of providing an air-lock or buffer between the cold-storage room and the elevator-shaft. Doors E are provided between these rooms and doors F between the room D and the shaft A. I purpose in my present improved system to dispense with or eliminate this anteroom D and make it a part of the regular cold-storage space, and I refer to it here as an anteroom or air-lock in order to explain the prior and present state of the art and to distinguish between the same and my present invention and method.

At G, I show the cab or car of the elevator, providing a traveling anteroom. In one form of my invention, as shown in Fig. 2, I place around the edges of the open face or faces or fronts H of the cab or car collapsible or flexible extensions of such size, arrangement, and structure that when the cab is contiguous to or covers an opening B in the elevator-shaft A the said extensions J will automatically close up or take up the space ordinarily left around the opening into the shaft and provide a vestibule between the cab and the floors or sides of the building and in such a manner that the cab itself being air-tight, or approximately so, aside from the open face or faces or fronts the cab will for the time being become a part of the room D, and all mechanical rush of the air through the cracks or spaces will be done away with. When therefore the cab or car comes into position before an opening in the elevator-shaft and the door or doors F, ordinarily placed between the shaft and the contiguous room, are opened, the spaces in the cab and in said room are simply merged temporarily. They become for the moment one room. Thus drafts and violent movements of the air into the elevator-shaft are avoided, and the rooms or spaces contiguous to the shaft become available for storage purposes. This is the object of my invention.

In Fig. 4 I have shown another form, in which the flexible bridging-pieces are placed on the edges or frame of the openings B instead of on the cab. The result, however, is the same.

It will be seen that my invention not only prevents the cold air from rushing out, which has always been a source of substantial loss, but it also prevents an inrush of warm and moisture-laden air. This warm air is not only harmful in itself, but deposits snow, which is very undesirable.

The cab or car may have one open face or front or it may have two, one on each side, and where in the specification and claims I state that it is open at the front or face only it is to be understood that the cab may be provided with two faces, one at the front and one at the side opposite to the front, or in some peculiar constructions the cab may be open at the end. In other words, the cab may have two or more fronts; but this is a mere duplication, the purposes being the same. In some buildings the elevator-shaft may extend centrally through the building or contiguous to two adjoining buildings or a building divided by a central wall. In any of these cases I can conveniently and economically provide opposite openings from the elevator-shaft and serve both sides or provide access to both compartments. It is manifest, however, that the principle is not herein modified, but that it simply constitutes, as aforesaid, a duplication or a double face or front. When, therefore, I speak in the specification or claims of a cab or car open at the front only, it is to be understood that I mean a cab or car closed or closable at all points or places except at the particular opening where access is had at the particular time for loading or unloading merchandise. The intent and purpose of my invention, as will be seen, is to establish an air-lock or a system of air-locks by means of the traveling anteroom and the openings from the elevator-shaft, and this air-lock is accomplished whether the cab or car is provided with one opening or whether it has two or more openings. In each and every instance or embodiment of my invention the air-lock is to be established when the opening of the traveling anteroom registers with the opening in the elevator-shaft. It is to be understood that where in the specification and claims I employ the term "air-lock" I refer to and call for any means for preventing the escape of air from the cooled room to any other place than into the elevator-car which is opening into that particular cooled room at the time—that is to say, the bodies of air in the said cooled room and the said elevator-car or traveling anteroom at the particular time when the two stand opposite each other and the door between them is opened merge and become one body of air, and any passage of such body of air beyond these compartments will for the time being be rendered impossible—and, as above stated, I employ the expression "air-lock" as applying to this condition. This cab or car becomes and operates as a traveling anteroom.

Having thus described my invention, the following is what I claim as new therein and desire to secure by Letters Patent:

1. A refrigerator-building comprising two or more floors, an elevator-shaft, means of access between the floors and said shaft, an elevator-car providing a traveling anteroom operating in said shaft, and means whereby an air-lock is established between said elevator-car and each floor when they are thrown together.

2. A refrigerator-building comprising two or more floors, an elevator-shaft, means of access between the floors and said shaft, an elevator-car providing a traveling anteroom operating in said shaft, and means surrounding the car-opening for bridging and sealing the spaces and providing a vestibule between the said elevator-car and each floor when they are thrown together.

3. A refrigerator-building comprising two or more floors, an elevator-shaft having openings at each floor, an elevator-car providing a traveling anteroom open at the front and flexible bridging-pieces for surrounding the contiguous openings of the car and elevator-shaft to provide a vestibule for closing the space between the car and the shaft-openings.

4. A refrigerator-building comprising two or more floors, each floor having a storage-room, and an elevator-shaft having openings into the storage-rooms, an elevator-car providing a traveling anteroom open at the front only, and flexible bridging-pieces for surrounding the contiguous openings of the car and elevator-shaft to provide a vestibule for closing the space between the car and the shaft-openings into the storage-rooms.

5. A refrigerator-building comprising two or more floors, each floor having a storage-room, an elevator-shaft extending through the storage-rooms and having openings into the storage-rooms, an elevator-car providing a traveling anteroom open at the front only, and flexible bridging-pieces for surrounding the contiguous openings of the car and elevator-shaft to provide a vestibule for closing the space between the car and the shaft-openings into the storage-rooms.

6. A refrigerator-building comprising two or more floors, each floor having a storage-room, an elevator-shaft having openings into the storage-rooms, an elevator-car providing a traveling anteroom open at the front only, and flexible bridging-pieces secured to the bottom, top, and sides of the car and for surrounding the contiguous openings of the car and elevator-shaft to provide a vestibule for closing the space between the car and the shaft-openings into the storage-rooms.

JAMES WILLS.

Witnesses:
HERBERT KNIGHT,
K. ELLIS.